US011305810B2

(12) United States Patent
Patel et al.

(10) Patent No.: US 11,305,810 B2
(45) Date of Patent: Apr. 19, 2022

(54) METHOD AND SYSTEM TO SYNCHRONIZE NON-DETERMINISTIC EVENTS

(71) Applicant: Steering Solutions IP Holding Corporation, Saginaw, MI (US)

(72) Inventors: Keyur Patel, Saginaw, MI (US); Sreekanth Siddam, Auburn Hills, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 188 days.

(21) Appl. No.: 16/857,610

(22) Filed: Apr. 24, 2020

(65) Prior Publication Data

US 2021/0331737 A1 Oct. 28, 2021

(51) Int. Cl.
| | | |
|---|---|---|
| *H02P 6/28* | (2016.01) | |
| *H02P 21/22* | (2016.01) | |
| *H02P 27/06* | (2006.01) | |
| *G05B 15/02* | (2006.01) | |
| *B62D 5/04* | (2006.01) | |

(52) U.S. Cl.
CPC ........... *B62D 5/0463* (2013.01); *G05B 15/02* (2013.01); *H02P 6/28* (2016.02); *H02P 21/22* (2016.02); *H02P 27/06* (2013.01)

(58) Field of Classification Search
CPC ...... B62D 5/046; B62D 5/0463; G05B 15/02; H02P 21/22; H02P 27/06; H02P 6/28
See application file for complete search history.

(56) References Cited

U.S. PATENT DOCUMENTS

| | | | |
|---|---|---|---|
| 3,903,857 A | 9/1975 | Honig et al. | |
| 3,967,170 A * | 6/1976 | MacDonald | ............... H02P 5/52 318/85 |
| 4,063,539 A | 12/1977 | Gorille et al. | |
| 4,099,495 A | 7/1978 | Kiencke et al. | |
| 4,287,565 A | 9/1981 | Haubner et al. | |
| 4,460,853 A * | 7/1984 | Quinn | ....................... H02P 3/22 318/86 |
| 4,486,832 A | 12/1984 | Haubner et al. | |
| 6,194,856 B1 | 2/2001 | Kobayashi et al. | |
| 6,260,058 B1 | 7/2001 | Hoenninger et al. | |
| 6,567,476 B2 | 5/2003 | Kohl et al. | |
| 6,567,840 B1 | 5/2003 | Binns et al. | |
| 6,630,993 B1 | 10/2003 | Hedges et al. | |

(Continued)

*Primary Examiner* — Thai T Dinh
(74) *Attorney, Agent, or Firm* — Dickinson Wright PLLC

(57) ABSTRACT

Technical solutions for controlling operation of an electric machine by a control system are provided. The control system comprises an inverter and a controller performing a first operation to produce a first output data representing a motor control current command in a first time period beginning at one of a plurality of initial times occurring at a first periodic timing interval. The controller also performs a second operation upon the first output data to produce a second output data in a second time period. The controller also performs a third operation at a periodic command time to produce a motor control voltage command using the second output data in response to satisfaction of a timing criterion. The timing criterion is based upon comparing the command time and occurrence of a posting time after the initial time. A method of enforcing timing restriction to synchronize non-deterministic motor control events is also provided.

20 Claims, 6 Drawing Sheets

(56) References Cited

U.S. PATENT DOCUMENTS

| | | | |
|---|---|---|---|
| 7,816,723 B2* | 10/2010 | Klinger | H01L 29/42328 |
| | | | 257/315 |
| 9,236,814 B2 | 1/2016 | Kaneko | |
| 10,205,416 B2 | 2/2019 | Furukawa et al. | |
| 10,541,638 B2* | 1/2020 | Shouji | H02P 21/18 |
| 2008/0162989 A1 | 7/2008 | Weiberle et al. | |
| 2013/0204580 A1 | 8/2013 | Boehl et al. | |
| 2015/0077025 A1* | 3/2015 | Suzuki | H02P 21/05 |
| | | | 318/400.02 |
| 2016/0299839 A1 | 10/2016 | Biewer et al. | |
| 2017/0025973 A1 | 1/2017 | Sugiyama et al. | |
| 2018/0006590 A1 | 1/2018 | Furukawa | |

* cited by examiner

METHOD AND SYSTEM TO SYNCHRONIZE NON-DETERMINISTIC EVENTS

BACKGROUND

The present application is generally related to methods and systems of enforcing timing of a periodic event. More specifically, the present application is generally related to methods and systems for enforcing timing of a periodic command used for controlling operation of an electric machine.

Conventional torque-based motor control systems, such as those used in electric power steering (EPS) or steer-by-wire applications, generate a motor current command that is used to compute a motor voltage command, which is ultimately used to compute phase voltages supplied to a motor. Such conventional torque-based motor control systems immediately make the motor current commands available for voltage command computation. This can result in variation, or jitter, in the timing between updates of the motor voltage command.

SUMMARY

According to one or more embodiments, a control system for controlling operation of an electric machine comprises an inverter operable to rectify current from alternating current phase buses of the electric machine to a direct current bus with switches, and a controller. The controller is operable to perform a first operation to produce a first output data representing a motor control current command in a first time period beginning at an initial time, wherein the initial time is one of a plurality of initial times occurring at a first periodic timing interval. The controller is also operable to perform a second operation upon the first output data to produce a second output data in a second time period. At least one of the first time period and/or the second time period is a non-deterministic time period.

The controller is also operable to perform a third operation to produce a motor control command at one of a plurality of command times occurring at a second periodic timing interval. The third operation uses the second output data in response to satisfaction of a timing criterion based upon comparing the one of the plurality of command times and occurrence of a posting time after the initial time.

According to one or more embodiments, a method of enforcing timing of a periodic motor control event is provided. The method comprises: performing a first operation to produce a first output data in a first time period beginning at an initial time, wherein the initial time is one of a plurality of initial times occurring at a first periodic timing interval; performing a second operation upon the first output data to produce a second output data in a second time period, with at least one of the first time period and/or the second time period being a non-deterministic time period; determining a posting time based upon a total of the first time period and the second time period; enabling a third operation to produce a motor control command at one of a plurality of command times occurring at a second periodic timing interval; and performing the third operation upon the second output data in response to satisfaction of a timing criterion, the timing criterion based upon comparing the one of the plurality of command times and occurrence of the posting time after the initial time.

The method and system of the present disclosure provide for enforcing timing of a periodic event, which can reduce or eliminate jitter in processes that depend on that periodic event. These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

A method and system for enforcing timing of a periodic event is proposed in this disclosure. Example implementations of the method and system where the periodic event includes generating a motor control voltage command are also provided. Such periodic motor control voltage commands may be used for controlling an inverter coupled to an electric machine, such as a motor or a motor/generator. In various embodiments, the electric machine is configured to perform at least one of: applying an assist torque to a steering system of a vehicle, and controlling the steering system.

Figure 1:
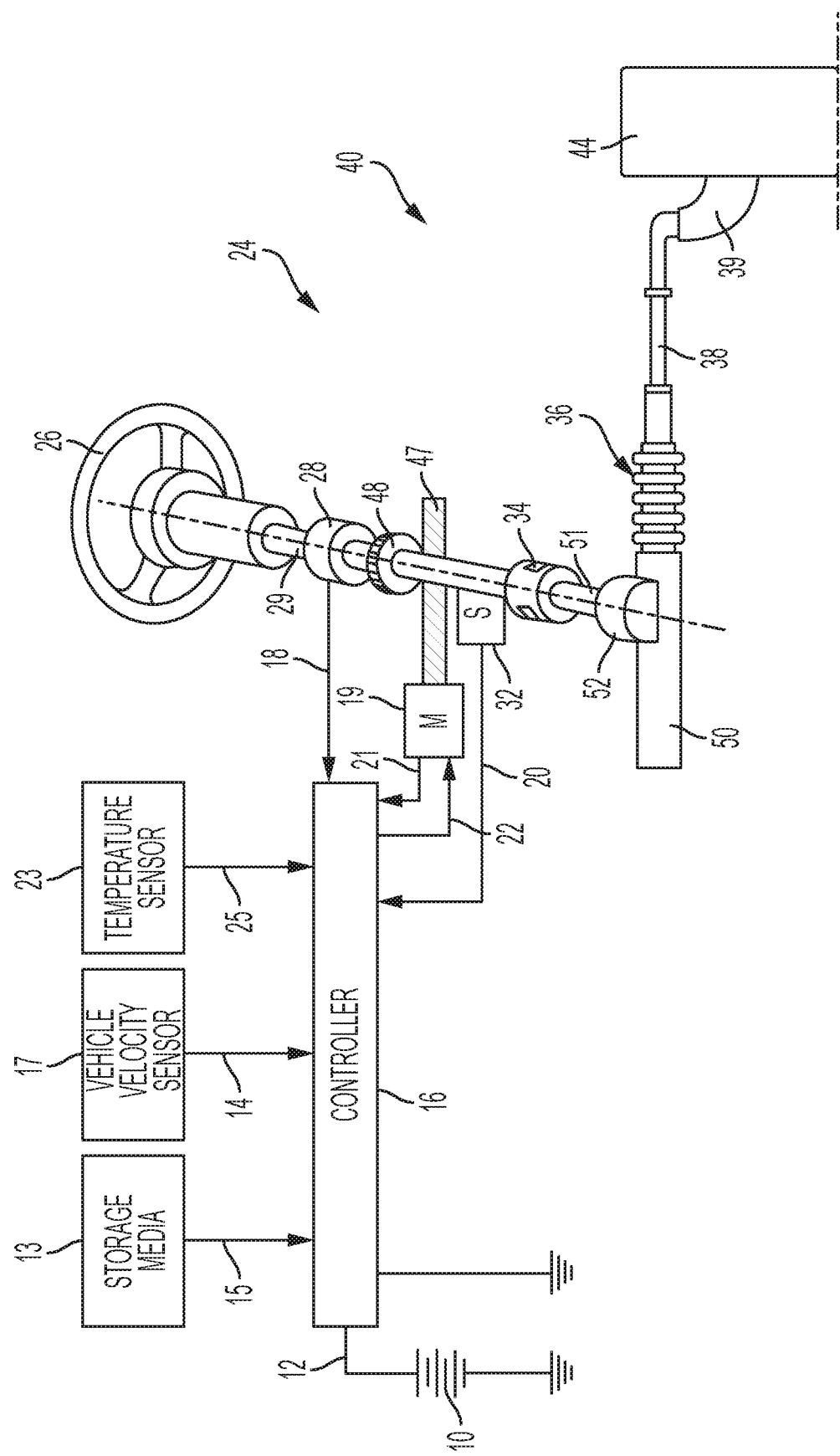
FIG. 1 depicts a block diagram of an exemplary embodiment of an electric power steering system according to aspects of the present disclosure.

Referring now to the figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g., a hand wheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor (PMSM), and is hereinafter denoted as electric machine 19. The controller 16 is powered by the vehicle power supply 10 through direct current bus 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32, over a prescribed time interval. For example, motor speed $\omega_m$ may be determined as the derivative of the motor position $\theta$ from the equation $\omega_m=\Delta\theta/\Delta t$ where $\Delta t$ is the sampling time and $\Delta\theta$ is the change in position during the sampling interval. Alternatively, motor velocity may be derived from motor position as the rate of change of position with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric machine 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the electric machine 19. Controller 16 is configured to develop the corresponding voltage(s) out of inverter (not shown), which may optionally be incorporated with controller 16 and will be referred to herein as controller 16, such that, when applied to the electric machine 19, the desired torque or position is generated. In one or more examples, the controller 16 operates in a feedback control mode, as a current regulator, to generate the command 22. Alternatively, in one or more examples, the controller 16 operates in a feedforward control mode to generate the command 22. Because these voltages are related to the position and speed of the electric machine 19 and the desired torque, the position and/or speed of the rotor and the torque applied by an operator are determined. A position encoder is connected to the lower steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the foregoing. The position encoder outputs a position signal 20 indicating the angular position of the lower steering shaft 51 and thereby, that of the electric machine 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the electric machine 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time-based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Figure 2:
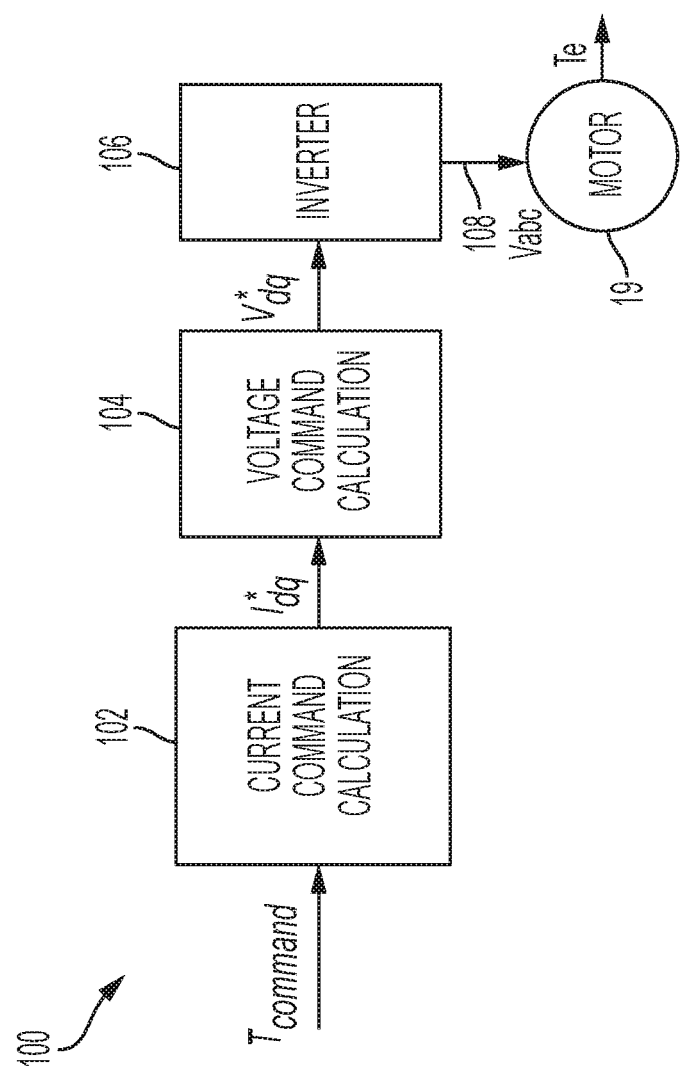
FIG. 2 depicts a block diagram of an example system for controlling a motor to satisfy a torque command according to aspects of the present disclosure.

FIG. 2 depicts a block diagram of an example system 100 for controlling a motor 19 to satisfy a torque command $T_{command}$ according to aspects of the present disclosure. The example system 100 may be implemented using hardware or a combination of hardware and software. The example system 100 includes a current command calculation block 102 and a voltage command calculation block 104 for controlling an inverter 106 to generates output phase voltages $V_{abc}$ upon an alternating current phase bus 108, causing the electric machine 19 to produce an output torque $T_e$. The current command calculation block 102 and the voltage command calculation block 214 may be implemented by the controller 16. For example, the current command calculation block 102 and the voltage command calculation block 214 may be separate software modules running on the controller 16.

Specifically, the example system 100 includes the current command calculation block 102 which is configured to generate direct and quadrature axis current commands, which may be collectively called final current commands $I^*_{dq}$. The final current commands $I^*_{dq}$ are transferred to the voltage command calculation block 104, which generates corresponding voltage commands $V^*_{dq}$. Those voltage commands $V^*_{dq}$ are supplied to the inverter 106. The inverter 106, thus, generates output phase voltages $V_{abc}$ upon the alternating current phase buses 108, causing the electric machine 19 to produce the output torque $T_e$. The output torque $T_e$ may be characterized as either an accelerating or a braking torque, depending on its direction relative to a rotation of the electric machine.

Figure 3:
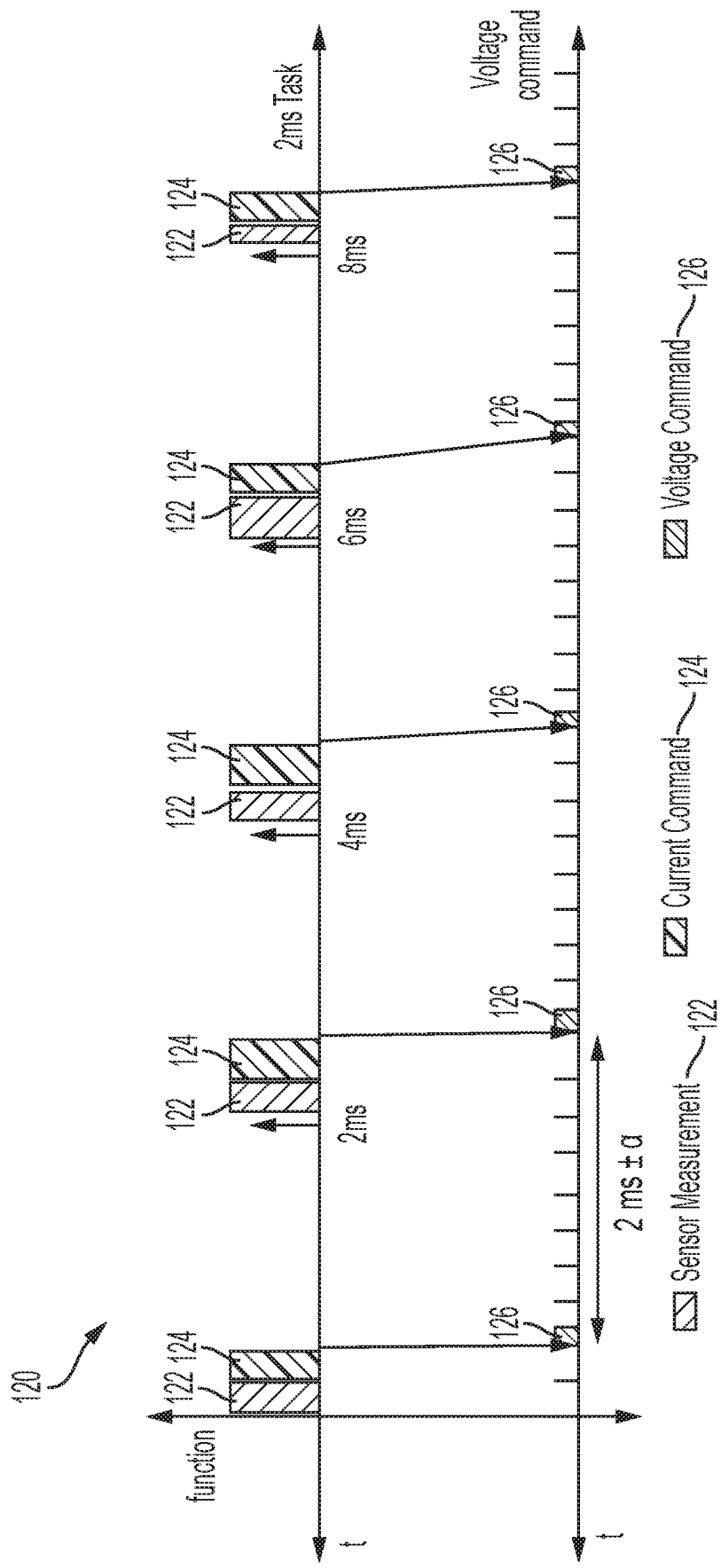
FIG. 3 depicts a first timing diagram of operations for controlling a motor according to conventional designs.

FIG. 3 depicts a first timing diagram 120 of operations for controlling a motor according to conventional designs. Specifically, the first timing diagram 120 includes a first task performed at first periodic timing interval of 2 milliseconds (ms). However, this is merely an example, and the first periodic timing interval may be any time period. The first task includes a first operation 122 taking a first time period. The first operation 122 is followed immediately by a second operation 124, which takes a second time period. The second operation 124 may operate upon a first output data produced by the first operation 122. For example, the first operation 122 may include capturing data from one or more sensors, and the second operation 124 may include processing that sensor data to generate a second output data representing a motor current command.

At least one of the first time period and/or the second time period is a non-deterministic time period. In some embodiments, the first time period is non-deterministic, and the second time period is fixed or deterministic. In some embodiments, the first time period is fixed or deterministic and the second time period is non-deterministic. In some embodiments, both the first time period and the second time period are non-deterministic. The term 'non-deterministic', unless otherwise defined, should be understood to mean including at least some degree of randomness. For example, a "non-deterministic time period" may vary, at least to some extent, from one instance to another. The term 'deterministic', unless otherwise defined, should be understood to mean not having any degree of randomness, and not substantially varying from one instance to another.

The first timing diagram 120 of FIG. 3 also includes a second task performed at second periodic timing interval, which may be substantially shorter than the first timing interval. The second periodic timing interval may be, for example 125 ms or 250 ms. However, these are merely examples, and the second periodic timing interval may be any time period. The second task includes a third operation 126. The third operation 126 may operate upon the second output data produced by the second operation 124. For example, the third operation 126 may include processing the second output data representing the motor current command to generate a motor voltage command. As shown in FIG. 3, the third operation 126 may operate upon the second output data produced by the second operation 124 upon the next instance of the second task after the second operation 124 is completed. For example, and as shown in FIG. 3, the timing between two consecutive third operations 126 may be 2 ms±α, where α is a variation in timing. The variation α may be, for example, 0.2 ms. This can lead to some variation in the timing of updating the motor voltage command. This variation may be called "jitter." Such jitter can result in undesirable operation.

Figure 4:
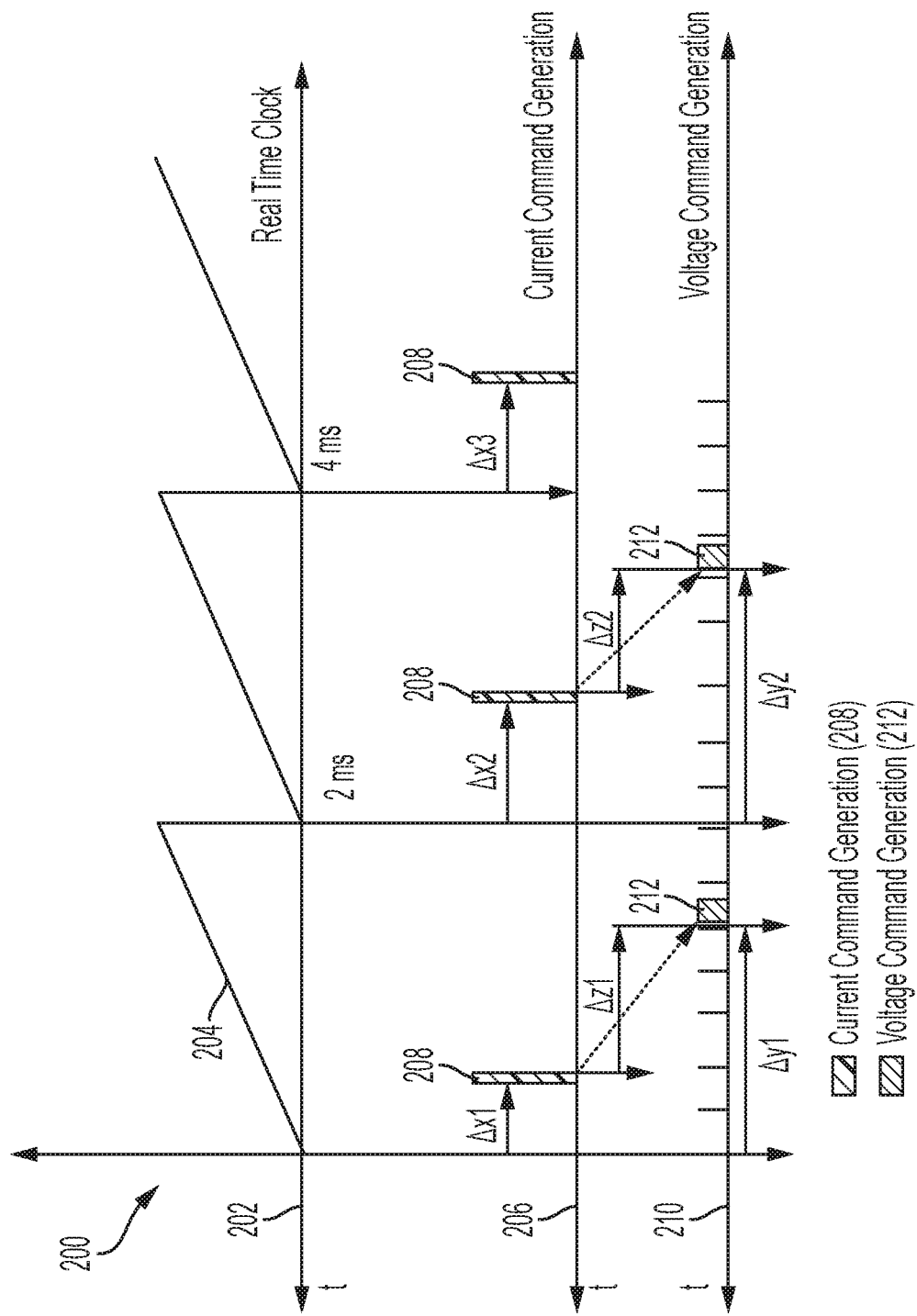
FIG. 4 depicts a second timing diagram of operations for controlling a motor according to aspects of the present disclosure.

In some embodiments, and as shown in FIG. 3, the start time of the first operation 122, the second operation 124, and the third operation 126 within a given period can vary. Also, the execution time of the first operation 122 and the second operation 124 can vary. For example, a data transmission delay between the first operation 122, the second operation 124, and/or the third operation 126 may vary depending on several different factors such as, number and type of interrupts, priorities of various tasks, method of data handling, processor bus architecture, etc. FIG. 4 depicts a second timing diagram 200 of operations for controlling a motor according to aspects of the present disclosure. Specifically, the second timing diagram 200 includes three plots 202, 206, 210 on a common time scale. A first plot 202 includes a line 204 showing values produced by a real time clock. The real time clock may be considered a deterministic signal having little to no variation over time, at least at a scale that is relevant to the present application.

The second timing diagram 200 also includes a second plot 206 showing current command generation. Specifically, the current command generation includes a first operation to produce a first output data representing a motor control current command in a first time period Δx1, Δx2, Δx3, beginning at an initial time, and ending with the first output data being ready at time 208. The first time period Δx1, Δx2 may include the time to complete all parts of producing the first output data, such as reading sensor data and computing the motor control current command based on that sensor data. The initial time is one of a plurality of initial times occurring at a first periodic timing interval of 2 ms as set forth by the real time clock. The 2 ms interval is merely an example, and the first periodic timing interval may have other values such as, for example, 1 ms. The current command generation may be performed by the current command calculation block 102, which may indicate the first output data being ready at time 208 by setting a flag, for example.

The second timing diagram 200 also includes a third plot 210 showing voltage command generation. The voltage command generation includes a second operation performed upon the first output data to produce a second output data in a second time period Δz1, Δz2. The second operation may include, for example, transferring the first output data from the current command calculation block 102 to the voltage command calculation block 104. Upon successful transfer, the transferred data may be called the second output data. The third plot 210 also shows a third operation 212 being performed after the second time period Δz1, Δz2. The third operation may include, for example, producing the motor control voltage command by the voltage command calculation block 104.

The present disclosure includes performing the third operation 212 using the second output data only upon satisfaction of a timing criterion. The timing criterion may include completion of the second operation 208 and occurrence of a posting time $t_{post}$ after the initial time. The posting time $t_{post}$ may introduce some additional delay in performing the third operation 212, when compared to conventional strategies that perform the third operation immediately upon completion of the second operation. The posting time $t_{post}$ after the initial time is indicated by the intervals period Δy1, Δy2 after the corresponding initial times, which are periodic events generated by the real time clock.

In some embodiments, for example where a real time clock is not available, a global clock or any common reference clock signal may be used to coordinate timing of the second and third operations 208, 212. For example, a CPU processor timing signal or a timing signal from an external source, such as another processor or device may be used to determine the initial time and the posting time $t_{post}$ after the initial time.

Figure 5:
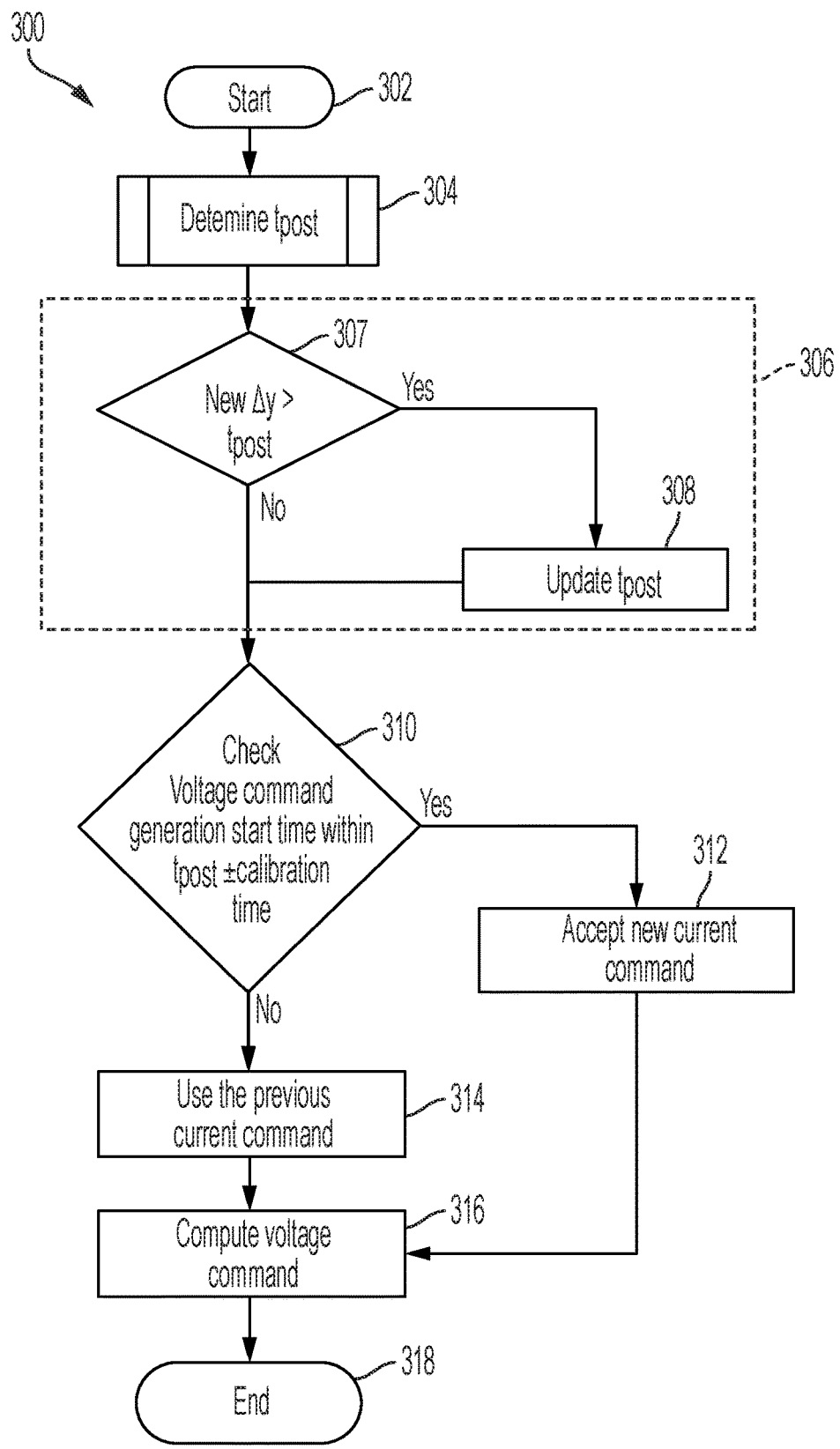
FIG. 5 depicts a flow diagram for calculating a voltage command according to aspects of the present disclosure.

FIG. 5 depicts a flow diagram showing steps in a method 300 of enforcing timing of a periodic motor control event according to aspects of the present disclosure. Specifically, the method 300 is used for periodically calculating a voltage command. However, the method 300 may be applied to other periodic motor control events that rely upon completion of operations in non-deterministic time periods. The method 300 starts at 302 and may run in a continuous loop as long as the system is operated. Each iteration of the method 300 may be synchronized with a first periodic timing interval, such as the 2 ms periodic events of the real time clock shown on the first plot 202 of FIG. 4.

The method 300 first includes determining an initial value of a posting time $t_{post}$ at step 304. The initial value of the posting time $t_{post}$ may be a stored value used previously. Alternatively, the initial value of the posting time $t_{post}$ may be a predetermined value, such as a factory set default value. Alternately, the initial value of the posting time $t_{post}$ may also be derived from deep learning or a machine-trained or simulated algorithm or any distributed computing or "cloud" algorithm.

The method 300 includes updating the posting time $t_{post}$ at step 306. Step 306 includes determining if an actual interval length Δy is greater than the posting time $t_{post}$ at step 307. The actual interval length Δy includes both of a first time period Δx taken to perform a first operation, and a second time period Δz taken to perform a second operation upon a first output data produced by the by the first operation. In other words, the second operation is performed immediately after completion of the first operation. For example, the first operation may include generating the first output data representing a current command by the current command calculation block 102, and the second operation may include transferring the first output data from the current command calculation block 102 to the voltage command calculation block 104 as a second output data. At least one of the first time period and/or the second time period is a non-deterministic time period, and therefore the actual interval length Δy is also non-deterministic. If the actual interval length Δy is greater than the posting time $t_{post}$, as determined at step 307, then the posting time $t_{post}$ may be updated at step 308. For example, the posting time $t_{post}$ may be set equal to the actual interval length Δy. This is merely an example, and step 306 of updating the posting time $t_{post}$ may include other requirements, such as a deadband and/or method steps for decreasing the posting time $t_{post}$ based upon a smaller actual interval length Δy. In some embodiments, step 306 is performed continuously or periodically throughout operation of the system. In some other embodiments, step 306 is performed only a finite number of times. More specifically, step 306 may be performed a fixed number of times after a system initialization event, after which the posting time $t_{post}$ may is unchanged. For example, step 306 of updating the posting time $t_{post}$ may be performed only the first one hundred times that the method 300 is run after the system initialization event (e.g. after a vehicle key-on event). This one hundred times is merely an example, and the actual fixed number of times may be any finite number.

The method 300 proceeds with determining if a timing criterion is satisfied at step 310. In some embodiments, and as shown in FIG. 5, the timing criterion includes a voltage command generation start time being within the posting time $t_{post}$ plus or minus a calibration time at step 310. The voltage command generation start time may be performed at a second periodic interval, and may be synchronous or asynchronous to the first periodic timing interval. For example, if the posting time $t_{post}$ is 500 μs, and the calibration time is 50 μs, then a voltage command generation start time that happens within the time span of 450 μs to 550 μs after the initial time satisfies the timing criterion. In some other embodiments, the timing criterion may be the voltage command generation start time happening after occurrence of the posting time $t_{post}$ after the initial time. In some other embodiments, the timing criterion may be the voltage command generation start time happening after occurrence of the posting time $t_{post}$ after the initial time, but not after the calibration time after the posting time. For example, if the posting time $t_{post}$ is 500 μs, and the calibration time is 50 μs, then only a voltage command generation start time that happens within the time span of 500 μs to 550 μs after the initial time satisfies the timing criterion.

The method 300 proceeds with performing a third operation upon the second output data in response to satisfaction of a timing criterion at step 312. For example, the voltage command calculation block 104 may accept the second data as a new current command to be used if the timing criterion is satisfied at step 310. If the timing criterion is not satisfied at step 310, then the voltage command calculation block 104 may instead use a previous current command at step 314. In other words, if the voltage command calculation block 104 may not accept the second data as a new current command to be used if the timing criterion is not satisfied at step 310. The method 300 proceeds with computing the voltage command at step 316. The voltage command may be calculated by the voltage command calculation block 104 using either the new current command or using a previous current command, depending on the outcome of steps 310-314. The method concludes at step 318. The method 300 may proceed back to step 302 in a looping fashion.

The present disclosure provides a method of enforcing timing of a periodic motor control event. The method comprises performing a first operation to produce a first output data in a first time period Δx beginning at an initial time, where the initial time is one of a plurality of initial times occurring at a first periodic timing interval. The first operation may include, for example, generating a current command by the current command calculation block 102.

The method also includes performing a second operation upon the first output data to produce a second output data in a second time period Δz. The second operation may include transferring the first output data from a first module configured to perform the first operation to a second module configured to perform a third operation. For example, the second operation may include transferring the current command from the current command calculation block 102 to the voltage command calculation block 104. At least one of the first time period and/or the second time period is a non-deterministic time period.

The method also includes determining a posting time $t_{post}$ based upon a total of the first time period Δx and the second time period Δz. In some embodiments, determining the posting time $t_{post}$ includes the sub-steps of: determining an actual length of the first time period Δx to produce the first output data; determining an actual length of the second time period Δz to produce the second output data; calculating an actual interval length Δy new) as the actual length of the first time period (Δx) plus the actual length of the second time period (Δz); and revising the posting time $t_{post}$ based upon the actual interval length Δy new in response to the actual interval length Δy new being longer than the posting time $t_{post}$. In some embodiments, the sub-step of determining the posting time $t_{post}$ is performed a fixed number of times after a system initialization event, such as a key-on event, after which the posting time $t_{post}$ is unchanged.

The method also includes performing the third operation to produce a motor control command at one of a plurality of command times occurring at a second periodic timing interval. The third operation may include producing the motor control command as a motor control voltage command by the voltage command calculation block 104. The second periodic timing interval may be a shorter time than the first periodic timing interval. In some embodiments, the second periodic timing interval occurs an integer number of times within the first periodic timing interval. For example, the first periodic timing interval may be 2 ms, and the second periodic timing interval may be a higher rate (i.e. a shorter timing interval), which would occur multiple times within the first periodic timing interval.

The method also includes performing the third operation upon the second output data in response to satisfaction of a timing criterion, where the timing criterion is based upon comparing the one of the plurality of command times (i.e. when the third operation enabled or begun to be performed) and occurrence of the posting time $t_{post}$ after the initial time. In some embodiments, satisfaction of the timing criterion includes the one of the plurality of command times happening before occurrence of the posting time $t_{post}$ after the initial time. In some embodiments, satisfaction of the timing criterion includes the one of the plurality of command times happening within a predetermined calibration time after occurrence of the posting time $t_{post}$ after the initial time, but not before the posting time $t_{post}$. In some embodiments, satisfaction of the timing criterion includes the one of the plurality of command times happening within the predetermined calibration time before or after occurrence of the posting time $t_{post}$ after the initial time.

In some embodiments, the third operation may be performed upon a previous data input in response to non-satisfaction of the timing criterion. Alternatively or additionally, the third operation may not be performed in response to non-satisfaction of the timing criterion. For example, the voltage command may be held steady until the timing criterion is satisfied.

Figure 6A:
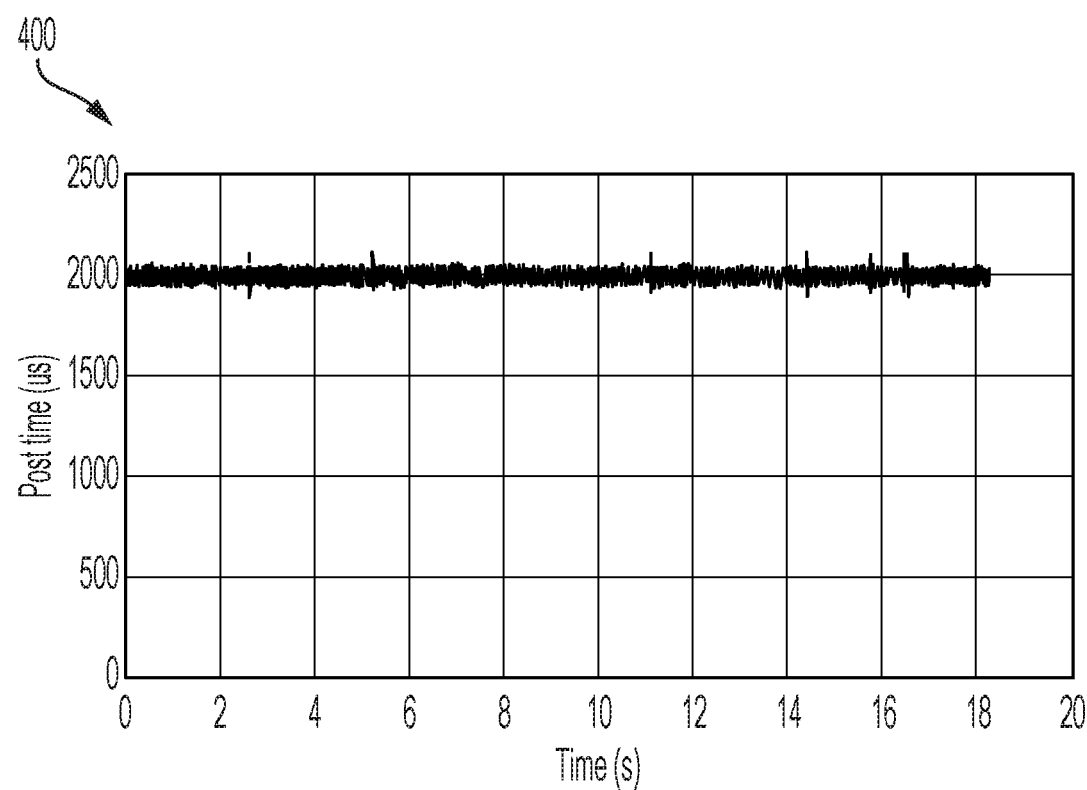
FIG. 6A depicts a graph of voltage command post times using a system having a conventional design.
Figure 6B:
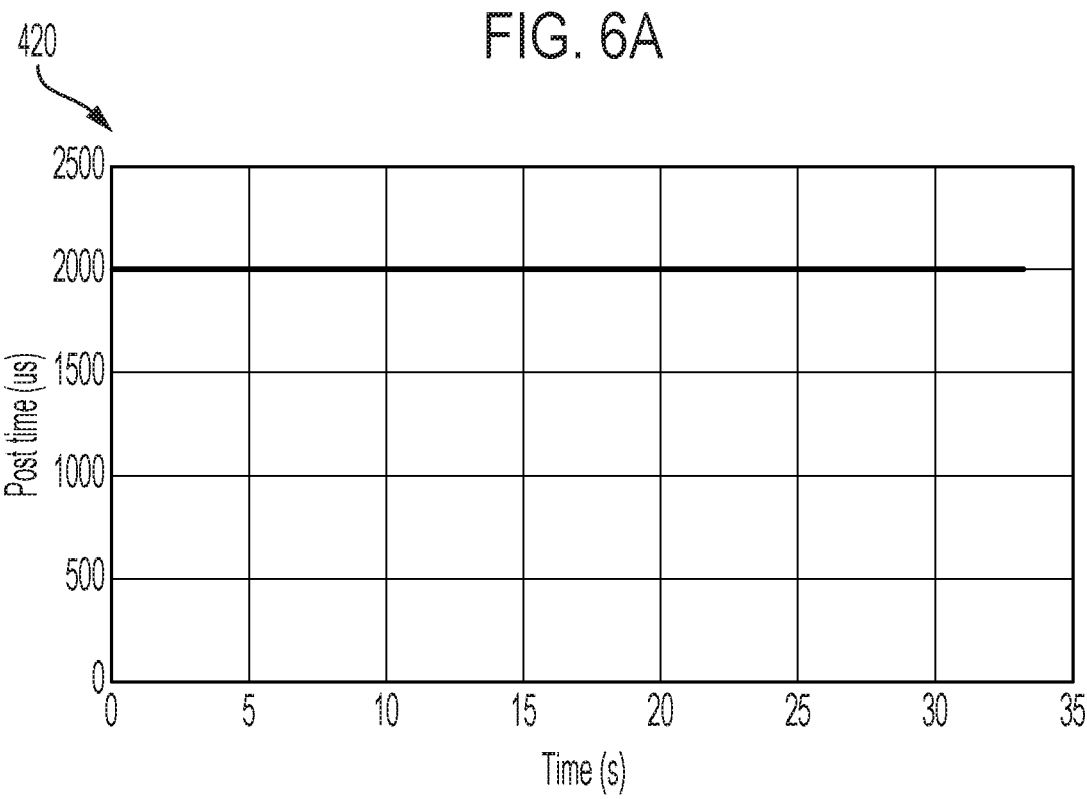
FIG. 6B depicts a graph of voltage command post times using a system according to aspects of the present disclosure.

FIG. 6A depicts a graph 400 of voltage command post times using a system having a conventional design. Specifically, the voltage command post times are all around 2000 μs, but there is some jitter or noise in the voltage command post times between about 1900 and about 2100 μs. FIG. 6B depicts a graph of voltage command post times using a system according to aspects of the present disclosure. The voltage command post times in FIG. 6B are represented by a flat line at 2000 μs, without the jitter or noise.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A control system for controlling operation of an electric machine, comprising:
    an inverter operable to rectify current from alternating current phase buses of the electric machine to a direct current bus with switches; and
    a controller operable to:
        perform a first operation to produce a first output data representing a motor control current command in a first time period beginning at an initial time, wherein the initial time is one of a plurality of initial times occurring at a first periodic timing interval;
        perform a second operation upon the first output data to produce a second output data in a second time period;
        wherein at least one of the first time period or the second time period is a non-deterministic time period;
        perform a third operation produce a motor control command at one of a plurality of command times occurring at a second periodic timing interval; and
        wherein the third operation uses the second output data in response to satisfaction of a timing criterion, the timing criterion based upon comparing the one of the plurality of command times and occurrence of a posting time after the initial time.

2. The control system of claim 1, wherein satisfaction of the timing criterion comprises the one of the plurality of command times happening after occurrence of the posting time after the initial time.

3. The control system of claim 1, wherein satisfaction of the timing criterion comprises the one of the plurality of command times happening within a predetermined calibration time of occurrence of the posting time after the initial time.

4. The control system of claim 1, wherein the motor control command produced by the third operation is a motor voltage command.

5. The control system of claim 1, wherein performing the third operation upon the second output data in response to satisfaction of the timing criterion further comprises performing the third operation upon a previous data input in response to non-satisfaction of the timing criterion.

6. The control system of claim 1, wherein the second periodic timing interval is a shorter time than the first periodic timing interval.

7. The control system of claim 1, wherein the controller is configured to determine the posting time by performing the steps of:
determining an actual length of the first time period to produce the first output data;
determining an actual length of the second time period to produce the second output data;
calculating an actual interval length as the actual length of the first time period plus the actual length of the second time period;
revising the posting time based upon the actual interval length.

8. The control system of claim 1, wherein the electric machine is configured to perform at least one of: applying an assist torque to a steering system of a vehicle, or controlling the steering system.

9. A method of enforcing timing restriction to synchronize non-deterministic motor control events, the method comprising:
performing a first operation to produce a first output data in a first time period beginning at an initial time, wherein the initial time is one of a plurality of initial times occurring at a first periodic timing interval;
performing a second operation upon the first output data to produce a second output data in a second time period;
wherein at least one of the first time period or the second time period is a non-deterministic time period;
determining a posting time based upon a total of the first time period and the second time period; and
enabling a third operation to produce a motor control command at one of a plurality of command times occurring at a second periodic timing interval; and
performing the third operation upon the second output data in response to satisfaction of a timing criterion, the timing criterion based upon comparing the one of the plurality of command times and occurrence of the posting time after the initial time.

10. The method of claim 9, wherein satisfaction of the timing criterion comprises the one of the plurality of command times happening after occurrence of the posting time after the initial time.

11. The method of claim 9, wherein satisfaction of the timing criterion comprises the one of the plurality of command times happening within a predetermined calibration time of occurrence of the posting time after the initial time.

12. The method of claim 11, wherein satisfaction of the timing criterion comprises the one of the plurality of command times happening within the predetermined calibration time before or after occurrence of the posting time after the initial time.

13. The method of claim 9, wherein performing the third operation upon the second output data in response to satisfaction of the timing criterion further comprises performing the third operation upon a previous data input in response to non-satisfaction of the timing criterion.

14. The method of claim 9, wherein the first operation comprises generating the first output data representing a motor control current command.

15. The method of claim 9, wherein the second operation comprises transferring the first output data from a first module configured to perform the first operation to a second module configured to perform the third operation.

16. The method of claim 9, wherein the third operation comprises generating a motor control voltage command using the second output data.

17. The method of claim 9, wherein the second periodic timing interval is a shorter time than the first periodic timing interval.

18. The method of claim 9, wherein the second periodic timing interval occurs an integer number of times within the first periodic timing interval.

19. The method of claim 9, wherein determining the posting time further comprises:
determining an actual length of the first time period to produce the first output data;
determining an actual length of the second time period to produce the second output data;
calculating an actual interval length as the actual length of the first time period plus the actual length of the second time period;
revising the posting time based upon the actual interval length in response to the actual interval length being longer than the posting time.

20. The method of claim 9, wherein determining the posting time is performed a fixed number of times after a system initialization event, after which the posting time is unchanged.

* * * * *